UNITED STATES PATENT OFFICE.

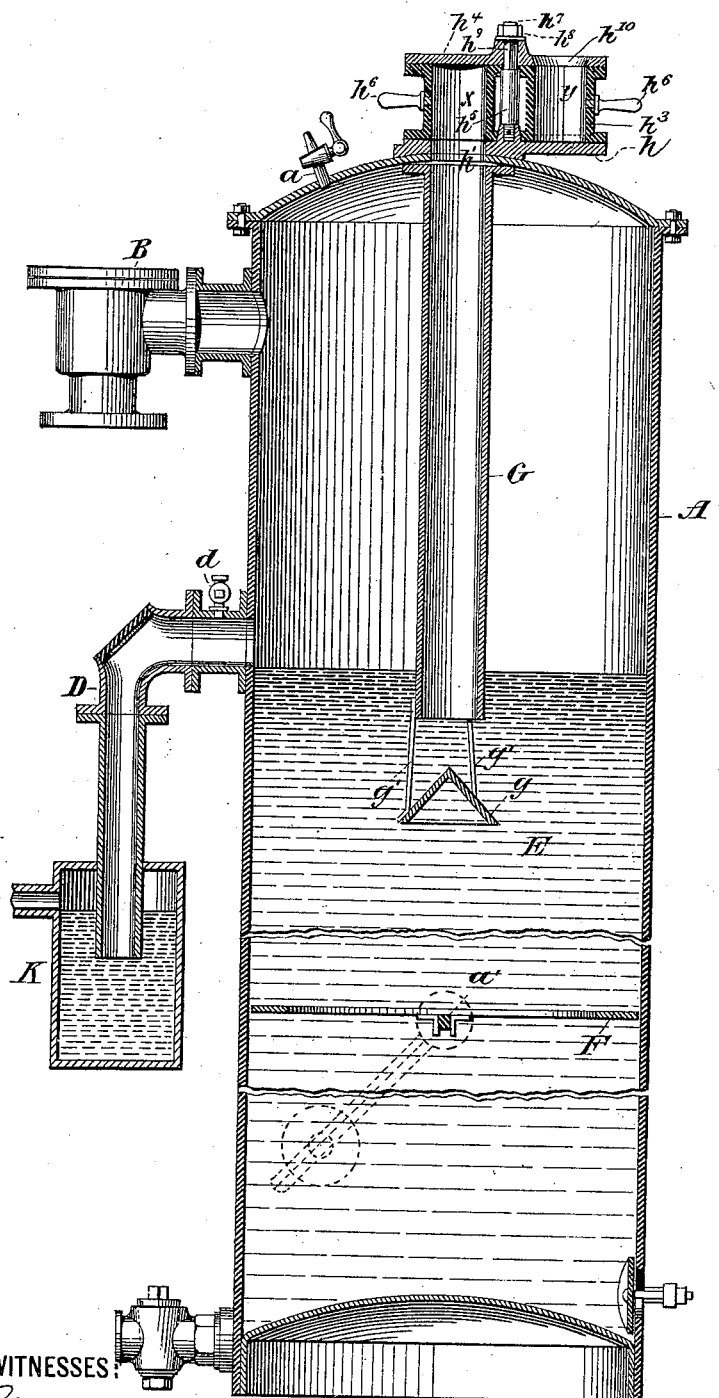

HEINRICH GERDES, OF BERLIN, GERMANY, ASSIGNOR TO THE SAFETY CAR HEATING AND LIGHTING COMPANY, OF NEW YORK, N. Y.

ACETYLENE-GENERATOR.

SPECIFICATION forming part of Letters Patent No. 642,600, dated February 6, 1900.

Application filed December 12, 1898. Serial No. 698,950. (No model.)

*To all whom it may concern:*

Be it known that I, HEINRICH GERDES, engineer, a subject of the German Emperor, residing at Berlin, Germany, have invented certain new and useful Improvements in Acetylene-Generators; and I do hereby declare the following to be a full, clear, and exact description of the invention, such as will enable others skilled in the art to which it appertains to make and use the same.

My invention relates to acetylene-generators, and has for its object to produce a safe and efficiently-acting acetylene-generator.

To these ends my invention consists in the special matters hereinafter claimed.

With the aid of the accompanying drawing, forming part hereof, I will describe one form of generator embodying my invention, as required by law, it being understood, however, that I do not thereby limit myself to the special form thus shown and described.

In the drawing, which is a sectional elevation of an apparatus embodying my invention, A is a strong gas-tight tank or cylinder, which may be of any usual or preferred construction. This tank is provided with a pipe B, suitable for drawing off the acetylene gas formed. It is also provided with a pipe D, which determines or regulates the height of the liquid E contained within the tank. This pipe D preferably dips into a water seal K, as shown. A pipe or cock $d$ communicates with the interior of the tank A and a blow-off device or cock $a$ is provided at or near the top of the said tank for a purpose presently to be explained.

Mounted in the tank A is a suitable shaft $a'$, capable of being rotated by a weighted handle $a^2$, attached thereto, which shaft carries a grate or platform F for receiving and supporting the carbid charge.

G is the carbid-feed conduit or pipe, located within the tank and preferably extending from the top of the said tank downward and terminating below the upper end of the pipe D, so as to dip below the water-line in the said tank. This pipe may be provided with a suitable distributer, shown in the present instance as a cone $g$, suspended from the lower end of the pipe G by straps $g'$. Located at the top of the tank is a carbid-feeding device or feeder, shown in the present instance as consisting of a stationary platform $h$, secured to the top of the tank and provided with an aperture $h'$, communicating with the pipe G. The platform $h$ supports a rotary hopper or receptacle $h^3$. Said hopper or receptacle is provided with a plurality of chambers $x\ y$ to receive carbid, which chambers are so located that when the receptacle $h^3$ is swung one of the said chambers will be in position to discharge its contents into the tube G and the other will be in position to be filled with carbid. The receptacle $h^3$ is pivoted on the bolt $h^5$ and can be swung by the handles $h^6$ or otherwise, so as to bring one or the other of the said chambers into registry with the tube G, one of the positions being shown in the drawing. The bolt $h^5$ is fastened to the platform $h$ and is provided on its upper end with a square portion $h^9$ and with a screw-bolt $h^7$. Upon the square portion $h^9$ the stationary top plate $h^4$ is mounted, closing the chamber $x$ or $y$ gas-tight when either is in position to discharge its carbid into the pipe G. The top plate $h^4$ is secured in place by a nut $h^8$, screwed upon the bolt $h^7$. When the parts are in the position shown in the drawing, the chamber $y$ is open at the top, access being had thereto through the hole $h^{10}$ in the top plate, and adapted to receive carbid, while the chamber $x$ is closed gas-tight at the top of the stationary top plate $h^4$.

I will now state the general operations and functions of the parts. Before doing so I will state that the principal objects of the invention are to produce an apparatus in which acetylene may be safely generated.

It is well known that a mixture of air and acetylene is highly explosive, and at the start of the operation the part of the tank above the water-line is filled with an acetylene-gas mixture and likewise under certain conditions also contains phosphin (phosphorous hydrid $PH_3$) in admixture, which mixture is highly explosive. It is almost impossible to make a tank strong enough to withstand this explosion, so that in order to start the operation right I have recourse to the operation of forcing acetylene into the tank through a suitable conduit leading to an acetylene-reservoir. The conduit employed for the purpose is preferably the pipe or cock lettered $d$ in the drawing. When acetylene is thus forced into the generator, it drives out the acetylene and air mixture or whatever gaseous mixture may be contained in the said generator, the blow-off device or cock $a$ being opened for the purpose of allowing such escape. When all of the dangerous elements have been forced out, the generating operation may be started and the supply of acetylene to the apparatus stopped by closing the cock or pipe $d$ and closing the cock $a$ to prevent escape of the acetylene generated. The carbid is placed in one of the chambers $x$ or $y$ and the feeder or receptacle $h^3$ turned to bring the chamber over the pipe G into the position shown in the drawing, the spare chamber being then in such a position as to receive another charge of carbid through the hole $h^{10}$. The carbid falls out of the chamber $x$ down the pipe G into the water E, the lower end of the pipe G being unobstructed and the upper end being closed gas-tight through the medium of the plate $h^4$ covering the chamber, which is in position to deliver carbid to the said pipe G. The carbid is distributed by the distributer $g$ and falls upon the grate F, where the generation occurs in the well-known manner, and the acetylene gas rises in the tank A and is withdrawn therefrom through the pipe B. The pipe G dips into the water and a water seal is thereby formed, but it frequently happens that gas finds its way into the pipe G principally by being generated from the carbid dust which floats upon the surface of the water in the pipe. The upper end of the pipe being closed, as described, this gas continues to collect, and when it has accumulated sufficient pressure forces the water-level down in the pipe G and escapes around the lower edge of the said pipe into the space in the tank above E. It will be observed, therefore, that by my preliminary operation of forcing out the dangerous gas mixture I diminish the chance of explosions, and by providing the closed feeder I prevent the escape of gas from the apparatus and at the same time provide an efficient means for feeding the carbid to the apparatus. It will be obvious that instead of providing a plurality of chambers $x$ $y$ the space occupied by one of the said chambers may be closed, as shown by the dotted lines in chamber $y$, so that in order to operate the apparatus it will be necessary to swing the feeder so as to bring the chamber $x$ from beneath the plate $h^4$, thereby closing the upper end of the pipe G and bringing the chamber $x$ into a position where it may be filled with carbid, whereupon the movement of the feeder may be reversed and the carbid dropped down the tube G in the same manner as before.

Having described my invention, and particularly one mode of carrying it into effect, what I claim, and desire to secure by Letters Patent, is—

In an acetylene-generator, the combination of a tank or water-receptacle, a grate or platform F for receiving and supporting the carbid charge, a carbid-feed pipe or conduit G located within the tank and extending from the top of the said tank downward, a pipe D in open communication with the side of the tank A and adapted to maintain the water-level, a water seal K for the said pipe, a gas-draw-off pipe B, a platform $h$ supported upon the tank A, an apertured top plate $h^4$, a bolt $h^5$ connecting the platform and top plate and a swinging carbid-receptacle having chambers $x$ $y$ extending entirely therethrough and adapted to be swung into the position of open communication with the pipe G or with the aperture in the plate $h^4$.

In testimony whereof I affix my signature in presence of two witnesses.

HEINRICH GERDES.

Witnesses:
ERWIN L. GOLDSCHMIDT,
HENRY HASPER.